US012648636B2

(12) United States Patent (10) Patent No.: US 12,648,636 B2
Liu (45) Date of Patent: Jun. 9, 2026

(54) ELECTRIC TOOTHBRUSH CAPABLE OF AUTOMATICALLY SQUEEZING TOOTHPASTE

(71) Applicant: Dongguan Yiting Household Products Technology Co., Ltd., Dongguan (CN)

(72) Inventor: Shibo Liu, Dongguan (CN)

(73) Assignee: Dongguan Yiting Household Products Technology Co., Ltd., Dongguan (CN)

( * ) Notice: Subject to any disclaimer, the term of this patent is extended or adjusted under 35 U.S.C. 154(b) by 0 days.

(21) Appl. No.: 19/016,789

(22) Filed: Jan. 10, 2025

(65) Prior Publication Data

US 2026/0150957 A1 Jun. 4, 2026

(30) Foreign Application Priority Data

Nov. 30, 2024 (CN) .......................... 202411743496.1
Dec. 19, 2024 (CN) ......................... 202411882753.X

(51) Int. Cl.
*A47L 13/22* (2006.01)
*A46B 5/00* (2006.01)
*A46B 13/02* (2006.01)
*A46B 13/04* (2006.01)
*A61C 17/22* (2006.01)

(52) U.S. Cl.
CPC ............ *A46B 13/04* (2013.01); *A46B 5/0095* (2013.01); *A46B 13/023* (2013.01); *A61C 17/227* (2013.01)

(58) Field of Classification Search
CPC .............. A46B 11/002; A46B 11/0037; A46B 11/0062; A46B 13/023

USPC ......................................................... 401/270
See application file for complete search history.

(56) References Cited

U.S. PATENT DOCUMENTS

| | | | |
|---|---|---|---|
| 6,241,412 B1 * | 6/2001 | Spies ................... | A46B 11/002 222/105 |
| 7,360,961 B1 | 4/2008 | Deane | |
| 8,740,490 B2 * | 6/2014 | Kuo ................... | A46B 11/0041 401/39 |
| 2010/0284726 A1 * | 11/2010 | Ottaviani ........... | A46B 11/0079 401/268 |
| 2019/0059569 A1 * | 2/2019 | Raku ..................... | A46B 7/042 |
| 2024/0057752 A1 | 2/2024 | Qi et al. | |

FOREIGN PATENT DOCUMENTS

| | | |
|---|---|---|
| CN | 114469417 A | 5/2022 |
| CN | 221998072 U | 11/2024 |

* cited by examiner

*Primary Examiner* — Jennifer C Chiang

(57) ABSTRACT

An electric toothbrush capable of automatically squeezing toothpaste includes a brush handle and a brush barrel, the brush handle is detachably mounted on the upper end of the brush barrel; the upper end of the brush handle is provided with bristles on the outside, and the brush handle is hollow inside to form a connecting hole extending to the bristle; a first one-way valve is provided near the bristle, with the output end of the first one-way valve facing the bristle; the brush barrel is provided with a material chamber, and a piston is installed inside the material chamber; a bottom of the brush barrel is equipped with an exhaust hole that is in communication with the material chamber; one opening end of the material chamber near the brush handle communicates with the connecting hole to form a pathway.

9 Claims, 11 Drawing Sheets

ELECTRIC TOOTHBRUSH CAPABLE OF AUTOMATICALLY SQUEEZING TOOTHPASTE

TECHNICAL FIELD

The present disclosure relates to the technical field of cleaning tools, particularly, to an electric toothbrush capable of automatically squeezing toothpaste.

BACKGROUND OF THE INVENTION

Toothbrush and toothpaste, as daily oral cleaning products, have a long and innovative development history, especially electric toothbrushes, which increasingly integrate intelligent technologies such as Bluetooth connection, pressure sensing, and timers to improve cleaning efficiency and promote good teeth-brushing habits.

The Chinese utility model patent CN221998072U discloses an electric toothbrush with toothpaste, divided into three parts: the toothbrush body assembly, the toothpaste box assembly, and the toothbrush head assembly. Before the electric toothbrush works, the toothpaste is already installed in the toothpaste box assembly. When the toothpaste in the toothpaste box assembly is used up, the toothpaste box assembly can be easily disassembled and discarded, and replaced with another toothpaste box assembly. The modular design makes the electric toothbrush easy to reuse.

However, in actual use, the toothpaste box is only disposable and cannot be reused, resulting in a waste of consumables. Consumers must also purchase spare toothpaste box assembly to continue using the toothbrush.

SUMMARY OF THE INVENTION

To overcome the shortcomings mentioned above, the present disclosure provides technical solutions that can solve the problems mentioned above.

An electric toothbrush capable of automatically squeezing toothpaste includes a brush handle and a brush barrel, the brush handle is detachably mounted on the upper end of the brush barrel. The upper end of the brush handle is provided with bristles on the outside, and the brush handle is hollow inside to form a connecting hole extending to the bristle. A first one-way valve is provided near the bristle, with the output end of the first one-way valve facing the bristle. The brush barrel is equipped with a material chamber for storing toothpaste, and a piston is installed inside the material chamber. The bottom of the brush barrel is equipped with an exhaust hole that communicates with the material chamber. One end of the material chamber near the brush handle opens and connects to the connecting hole to form a pathway.

The brush handle is equipped with a pressing pump inserted in the connecting hole. The pressing pump is an internal hollow structure with one end provided with a second one-way valve, and the other end provided with a third one-way valve embedded in the pressing pump. The output end of the third one-way valve faces the bristles. The pressing pump is provided with a pressing block. The wall surface of the brush handle corresponding to the pressing block is provided with a pressing port to expose the pressing block.

As the preferred solution for this disclosure: the inner upper end of the brush barrel is equipped with a fastening port, which is communicated to the material chamber. The lower end of the pressing pump is detachably connected to the fastening port so that the lower end of the third one-way valve is communicated with the fastening port. The fastening port is provided with an internal thread that fastens the outlet of the toothpaste container when the toothpaste is replenished in the material chamber.

As the preferred solution for this disclosure: the pressing pump includes a casing and a guiding element. The casing is inserted into the connecting hole to form two chambers inside the brush handle. The casing is a hollow structure. The second one-way valve is arranged at the upper end of the casing. The pressing block is provided on the side of the casing near the pressing port, and the guiding element is detachably installed inside the casing. A first through-hole is provided inside the guiding element, and one end of the first through-hole near the bristle is against the second one-way valve. A pressure hole is provided on the surface of the guiding element near the pressing block and in communication with the pressing block. The third one-way valve is detachably installed in the first through-hole away from the bristles. The output end of the third one-way valve faces the bristles, and the lower end of the guiding element is detachably connected to the fastening port so that the first through-hole communicates with the fastening port.

As the preferred solution for this disclosure: the brush barrel includes a storage column, a housing, and a base. The storage column is inserted into the housing, and the material chamber is set inside the storage column. The fastening port is embedded at the upper end of the housing, and the base is flexibly connected to one end of the housing so that the upper end surface of the base is against the open end of the material chamber.

As the preferred solution for this disclosure: the storage column is provided with a display strip on its wall corresponding to the material chamber. The display strip is a transparent strip displaying the amount of toothpaste stored in the material chamber. The wall of the housing is provided with a display slot for installing the display strip.

As the preferred solution for this disclosure: the base includes a soft rubber component and a bottom cover. The soft rubber component is detachably installed inside the bottom cover, the bottom cover is rotated to connect to one end of the housing away from the fastening port. The upper end surface of the soft rubber component is against the opening of the material chamber, and the exhaust hole is set inside the soft rubber component.

As the preferred solution for this disclosure: the inner of the bottom cover is provided with a block, and the soft rubber component is provided with a slot corresponding to the block. The soft rubber component is clamped in the slot through the block so that it is installed inside the bottom cover. The bottom of the soft rubber component is provided with anti-slip patterns to increase friction force.

As the preferred solution for this disclosure: the storage column is provided with a vibration assembly including a vibrating motor, a circuit board, and a battery. The vibrating motor is electrically connected to the circuit board, which is used to control the vibration of the vibrating motor. The battery is electrically connected to the vibrating motor and the control board, which controls the power supply of the battery to the vibrating motor.

As the preferred solution for this disclosure: the brush handle is equipped with a protective cover. The edge of the lower end of the brush handle is chamfered, and the lower end of the protective cover has an inward opening with a flange. The flange is chamfered to fix the protective cover to the brush handle.

As the preferred solution for this disclosure: the brush handle is provided with twisting blocks, and the lower end of the brush handle is mounted at least two twisting blocks.

Compared with existing technology, the beneficial effects of this disclosure are:

The electric toothbrush is set up with the pathway communicated to the bristles, the casing, and the guide piece are installed inside the brush handle, by pressing the pressing block, negative pressure is generated inside the brush handle to drive the piston inside the brush cylinder to move upward and deliver toothpaste to the bristles. At the same time, the toothpaste in the material chamber can be replenished using conventional toothpaste on the market, without purchasing customized toothpaste boxes for replacement.

The first one-way valve and the second one-way valve can ensure the sealing inside the brush handle, playing a dual waterproof role. When delivering toothpaste to the bristles, the second one-way valve can control the feeding of toothpaste, and then output it to the bristles through the first one-way valve, which can control the feeding amount of toothpaste, save materials, and promote environmental protection.

The additional aspects and advantages of the present disclosure will be partially presented in the following description, some of which will become apparent from the following description, or learned through practice of the present disclosure.

BRIEF DESCRIPTION OF THE DRAWINGS

To provide a clearer explanation of the embodiments of the present disclosure or the technical solutions in the prior art, a brief introduction will be given to the accompanying drawings required for the description of the embodiments or the prior art. It is obvious that the accompanying drawings described below are only some embodiments of the present disclosure. For those skilled in the art, other drawings can be obtained based on these drawings without creative labor.

DETAILED DESCRIPTION OF ILLUSTRATED EMBODIMENTS

Figure 1:
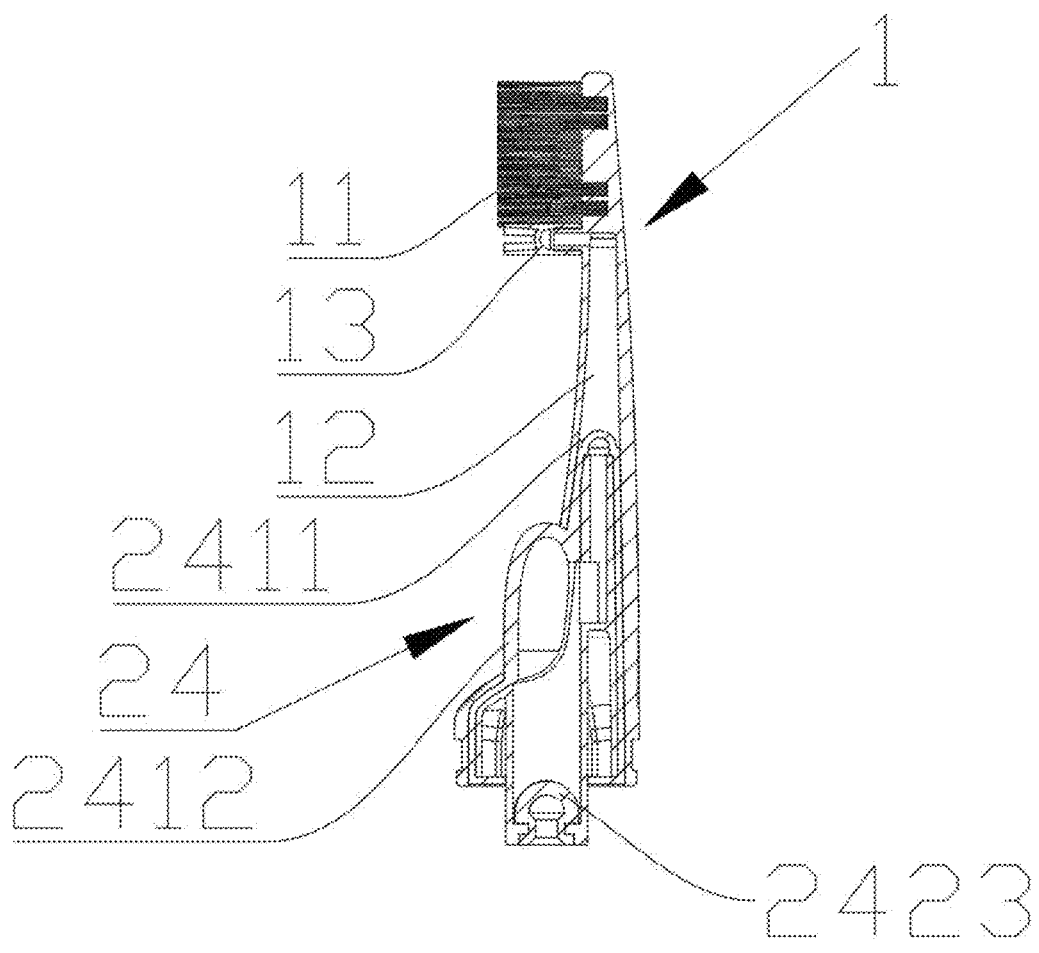
FIG. 1 is an in-section view exploded view of the brush handle.

The following will provide a clear and complete description of the technical solution in the embodiments of the present disclosure. Obviously, the described embodiments are only a part of the embodiments of the present disclosure, and not all of them. Based on the embodiments in this disclosure, all other embodiments obtained by ordinary skilled persons in this field without creative labor are within the scope of protection of this disclosure.

Please referring to FIGS. 1-5, in the embodiment in the present disclosure, an electric toothbrush capable of automatically squeezing toothpaste includes a brush handle 1 and a brush barrel 2, the brush handle 1 is detachably mounted on the upper end of the brush barrel 2. The upper end of the brush handle 1 is provided with bristle 11 on the outside, and the brush handle 1 is hollow inside to form a connecting hole 12 extending to the bristle 11. A first one-way valve 13 is provided near the bristle 11, with the output end of the first one-way valve 13 facing the bristle 11. The brush barrel 2 is equipped with a material chamber 21 for storing toothpaste, and a piston 22 is installed inside the material chamber 21. The bottom of the brush barrel 2 is equipped with an exhaust hole 23 that communicates with the material chamber 21. One end of the material chamber 21 near the brush handle 1 opens and connects to the connecting hole 12 to form a pathway.

The brush handle 1 is equipped with a pressing pump 24 inserted in the connecting hole 12. The pressing pump 24 is an internal hollow structure with one end provided with a second one-way valve 2411, and the other end provided with a third one-way valve 2423 embedded in the pressing pump 24. The output end of the third one-way valve 2423 faces the bristles 11. The pressing pump 24 is provided with a pressing block 2412 for pressing. The wall surface of the brush handle 1 corresponding to the pressing block 2412 is provided with a pressing port 14 to expose the pressing block 2412.

The working principle of the above embodiment is as follows: The operator presses the pressing block 2412 to compress the air in the connecting hole 12 to pass through the second one-way valve 2411, and then discharges the brush handle 1 through the first one-way valve 13, thereby forming negative pressure in the brush handle 1. Since the connecting hole 12 is in communication with the material chamber 12, negative pressure is also formed in the material chamber 2. In this situation, the piston 22 moves towards the bristles 11 to push the toothpaste into the material chamber 2 to be delivered to the bristles 11. After a period of use, the piston 22 moves to the upper end of the material chamber 21, at this time, the toothpaste in the material chamber 21 is used up. Operators can purchase marketed toothpaste to replenish the material chamber 21, align the toothpaste with the material chamber 21, and squeeze the toothpaste to enter the material chamber 21. The piston 22 located in the material chamber 21 is pushed downwards by the toothpaste feed, causing the air at the lower end of the piston 22 to be discharged from the exhaust hole 23. When the piston 22 moves to the lower end of the material chamber 21, the replenishment of the material chamber is completed.

In one embodiment, the brush handle 1 is a hard rubber component, and a soft rubber tube (not shown in the figure) can be installed in the connecting hole 12 in the brush handle 1. One end of the soft rubber tube is wrapped around the output end of the second one-way valve 2411 so that the toothpaste can be output from the second one-way valve 2411 into the soft rubber tube. The other end of the soft rubber tube extends to the bristles 11 so that toothpaste can be squeezed therefrom to the bristles 11. The first one-way valve 13 is installed on the other end of the soft rubber tube to prevent waterproofing and backflow of the toothpaste. The connecting hole 12 can be used for installing soft rubber tubes to deliver toothpaste to bristles 11, the soft rubber tubes have a good sealing effect and prevent toothpaste leakage.

In one embodiment, the connecting hole 13 is directly used as a delivery channel for toothpaste. The operator presses the pressing block 2412 to form negative pressure in the brush handle 1. The piston 22 located in the material chamber 21 in the brush barrel 2 is affected by the negative pressure and driven to move in a direction of the bristles 11, thereby pushing the toothpaste. The toothpaste is delivered from the third one-way valve 2423 to the second one-way valve 2411, then from the second one-way valve 2411 to the connecting hole 12. Thus the toothpaste can be delivered to the bristles 11 through the connecting hole 13.

Figure 5:
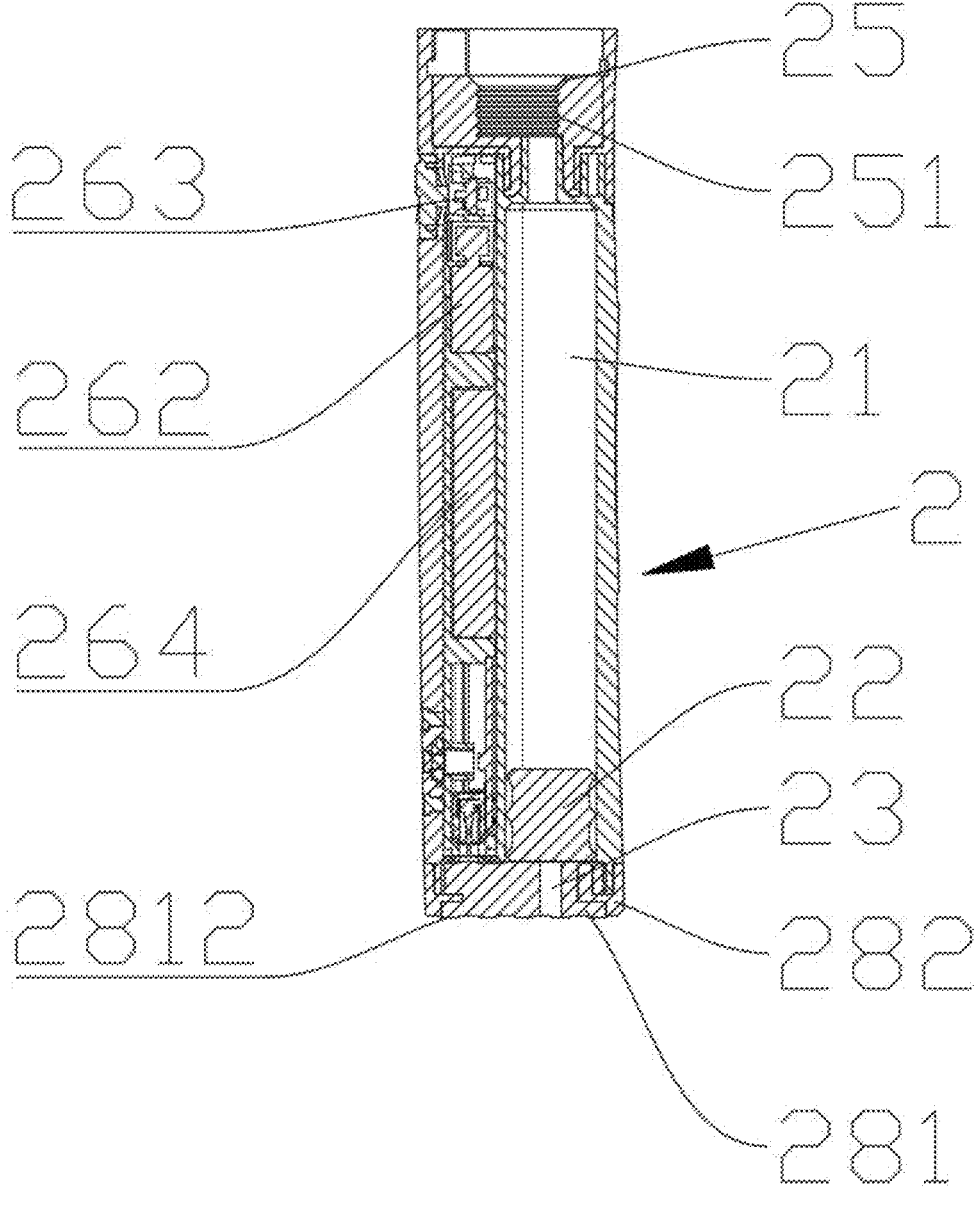
FIG. 5 is an in-section view of the brush barrel.
Figure 6:
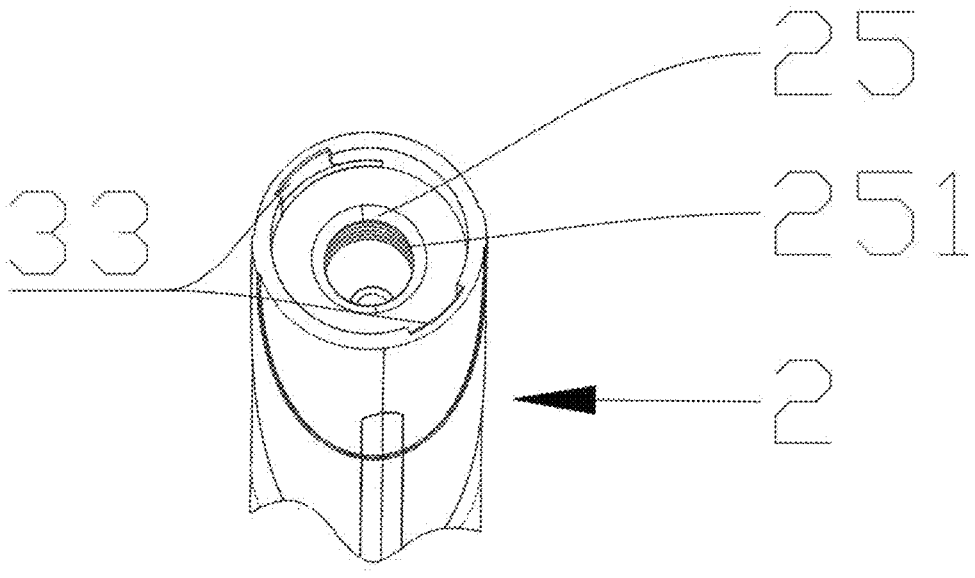
FIG. 6 is a perspective view of the fasten port.
Figure 7:
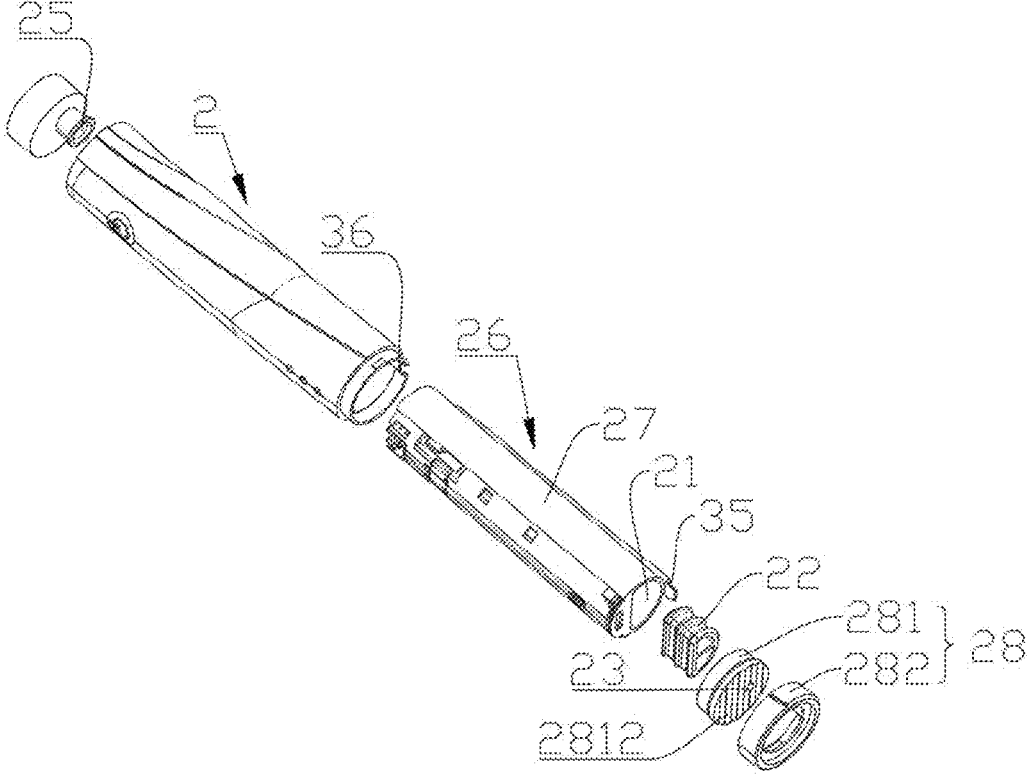
FIG. 7 is an exploded view of the brush barrel.

Further, as shown in FIGS. 5-7, in the embodiment, the inner upper end of the brush barrel 2 is equipped with a fastening port 25, and the fastening port 25 is connected to the material chamber 21. The lower end of the pressing pump 24 is detachably connected to the fastening port 25 so that the lower end of the third one-way valve 2423 is communicated to the fastening port 25. The fastening port 25 is provided with an internal thread 251 for fastening the outlet of the toothpaste container when the toothpaste is replenished to the material chamber 21.

The working principle of the embodiment is as follows: when replenishing the material chamber 21, the outlet of the toothpaste container can be fixedly connected to the brush barrel 2 through a threaded connection, which facilitates the operator to squeeze the toothpaste. On the other hand, it can prevent the operator from loosening the material chamber 21 and the paste outlet when squeezing the toothpaste, thereby preventing the toothpaste from leaking out.

Further, as shown in FIGS. 1-4, in one embodiment, the pressing pump 24 includes a casing 241 and a guiding element 242. The casing 241 is inserted into the connecting hole 12 to form two chambers inside the brush handle 1. The casing 241 is a hollow structure. The second one-way valve 2411 is arranged at the upper end of the casing 241. The pressing block 2412 is arranged on the side of the casing 241 near the pressing port 14, and the guiding element 242 is detachably installed inside the casing 241. A first through-hole 2421 is provided inside the guiding element 242, and one end of the first through-hole 2421 near the bristle 11 is against the second one-way valve 2411. A pressure hole 2422 is provided on the surface of the guiding element 242 near the pressing block 2412 and in communication with the pressing block 2412. The third one-way valve 2423 is detachably installed in the first through-hole 2421, the output end of the third one-way valve 2423 faces the bristles 11, the lower end of the guiding element 242 is detachably connected to the fastening port 25 so that the first through-hole 2421 communicates with the fastening port 25. Specifically, the material of the casing 241 is soft rubber, which enables the casing 241 to have a good sealing effect when installed inside the brush handle 1. The guiding element 242 is made from hard material, and the production methods of the guiding element 242 include but are not limited to injection molding or machining, etc. During installation, the installation methods between the guiding element 242 and the casing 241 include but are not limited to snap connections and threaded connections. The material of the third one-way valve 2423 is soft rubber, which can provide a good sealing effect when installed on the guiding element 242.

The connecting method of the third one-way valve 2323 and the guiding element 242 includes but not limited to the below methods:

As shown in FIG. 1, the third one-way valve 2323 is installed at the end of the first through hole 2421 away from the bristles 11, it can be configured a clamping block below the first through hole 2421 to hold the third one-way valve 2323.

Figure 2:
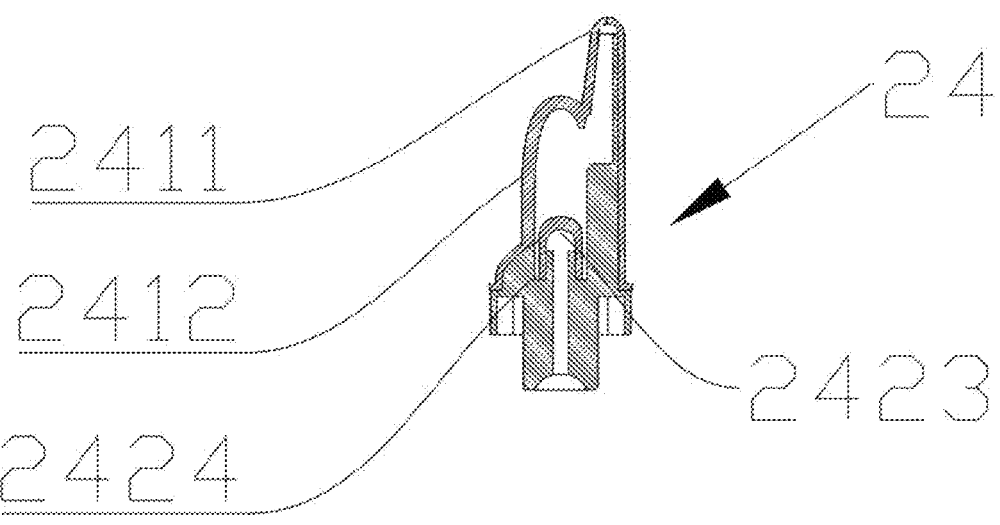
FIG. 2 is an in-section view of the locking groove.

As shown in FIG. 2, the end surface of the first through hole 2421 is provided with a locking groove 2424, the lower end of the third one-way valve is inserted in the locking groove 2424. When the operator presses the pressing element 2412, the air in the area between the third one-way valve 2423 and the first one way valve is discharged from the output of the second one-way 2411 valve to form a negative state. The third one-way valve 2423 and the first through hole 2421 is interference fit.

Figure 3:
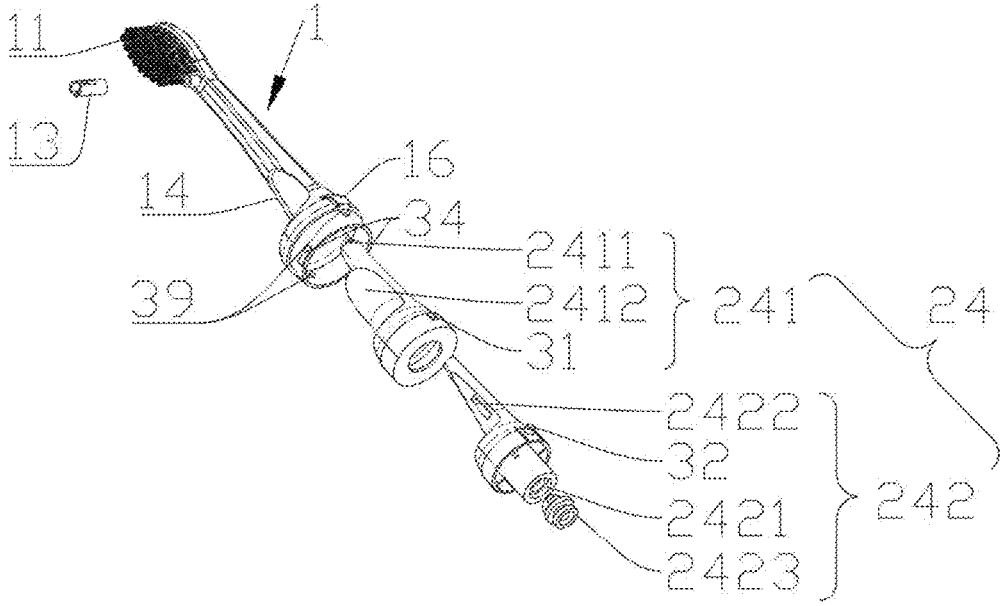
FIG. 3 is an exploded view of the brush handle.
Figure 4:
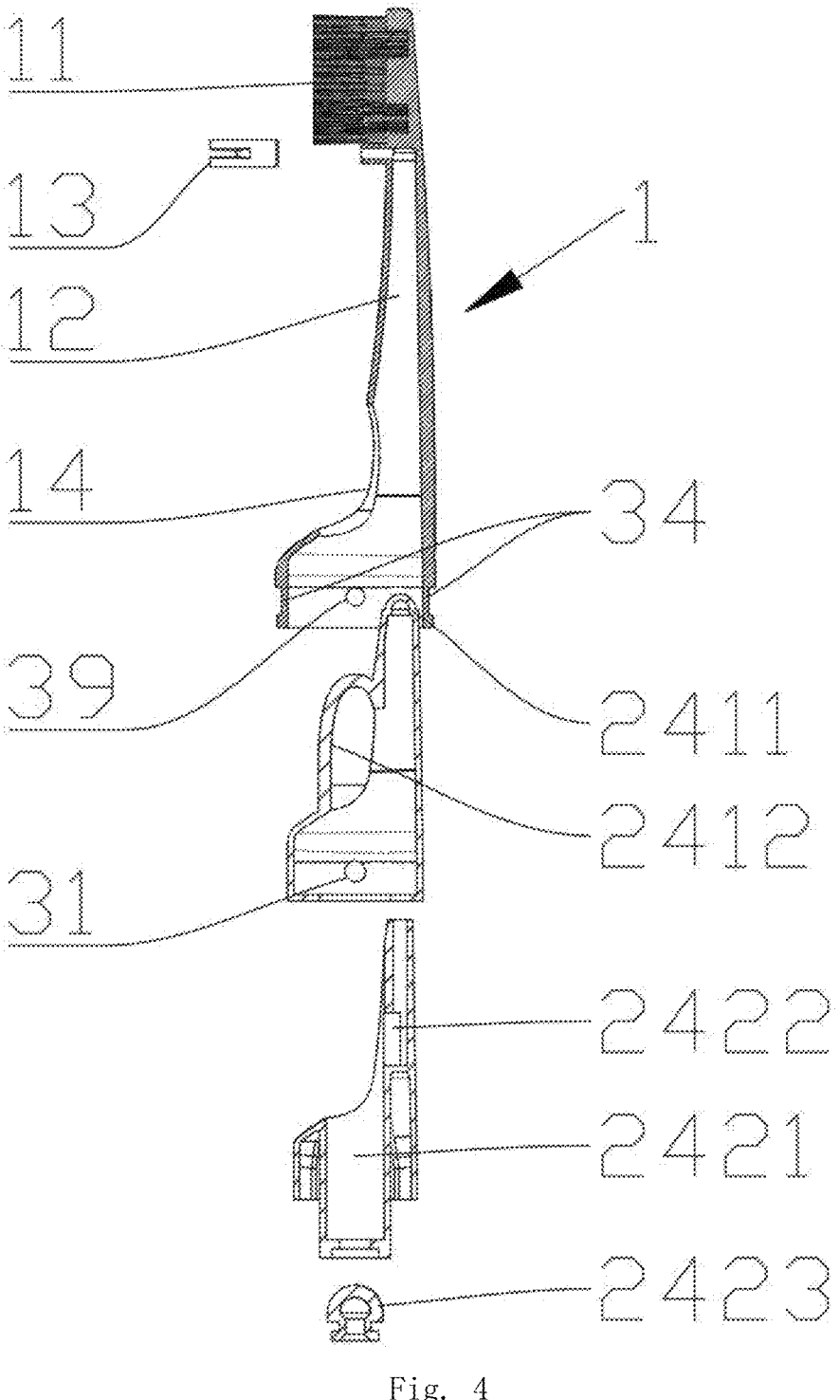
FIG. 4 is the other exploded view of the brush handle.

The work principles of the embodiment are as follows: the connecting methods between the casing 241 and the guiding element 242 include but are not limited to snap connections. As shown in FIG. 3, a first snap hole 31 is provided at the lower end of the casing 241, and a first protrusion 32 is provided at the lower end of the guiding element 242. When the guiding element 242 is inserted into the casing 241, the first protrusion 32 is precisely clamped in the first snap hole 31 to complete the installation of the guiding element 242. Furthermore, a second snap hole 39 is provided at the lower end of the brush handle 1. When the casing 241 is installed and inserted into the brush handle 1, the first protrusion 32 is clamped in the second snap hole 39, thereby completing the installation of the casing 241.

In the other embodiment, when the brush handle 1 is mounted on the brush barrel 2, the installation methods include but are not limited to snap connections and threaded connections. As shown in FIGS. 3-6, the upper end of the brush barrel 2 is provided with at least two first snap groove 33, and the lower end of the brush handle 1 is provided with a first clamp block 34 matching the first snap groove 33. During installation, the operator rotates the first clamping block 34, thereby mounting it in the first clamping groove 33, thereby completing the installation of the brush handle 1 and brush barrel 2. At the same time, the lower end of the guiding element 242 is inserted into the fastening port 25, and the material of the fastening port 25 in the brush barrel 2 can be soft rubber. The fit between the lower end of the guiding element 242 and the fastening port 25 can use interference fit to ensure sealing and avoid toothpaste leakage.

Further, as shown in FIGS. 5-14, in the embodiment, the brush barrel 2 includes a storage column 26, a housing 27, and a base 28. The storage column 26 is inserted into the housing 27, and the material chamber 21 is set inside the storage column 26. The fastening port 25 is embedded at the upper end of the housing 27, and the base 28 is flexibly connected to one end of the housing 27 so that the upper end surface of the base 28 is against the open end of the material chamber 21. The storage column 26 is installed inside the housing 27, the material chamber 21 is in communication with the fastening port 25.

Figure 8:
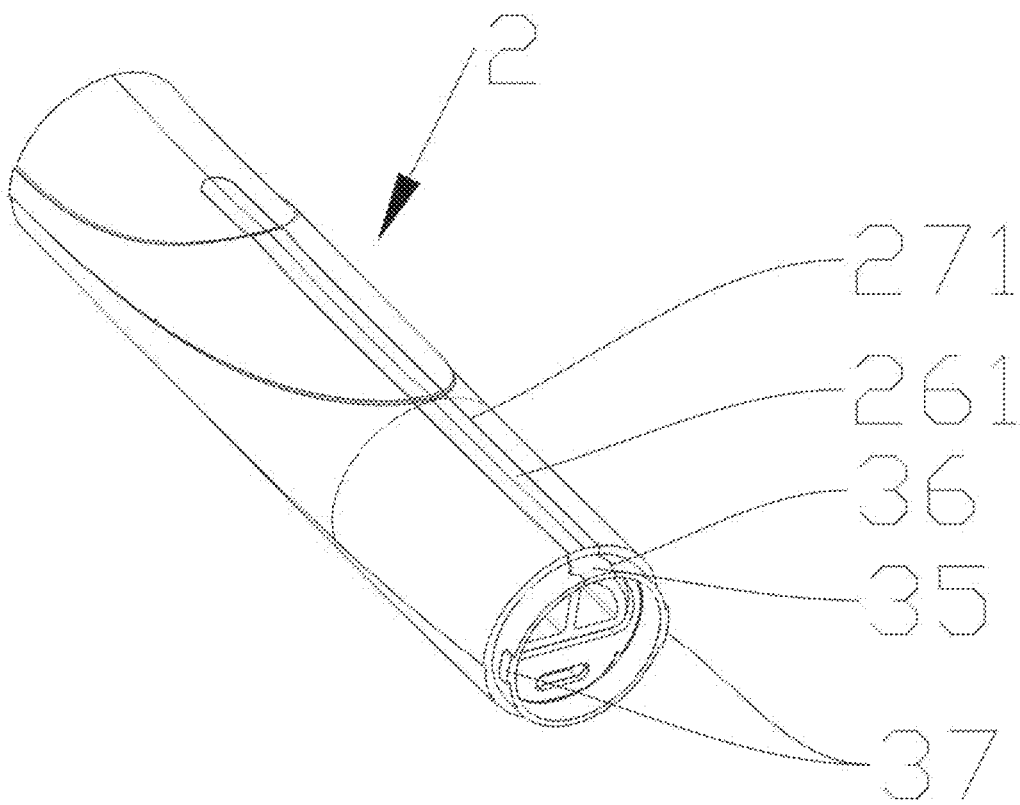
FIG. 8 is a perspective view of the brush barrel.
Figure 9:
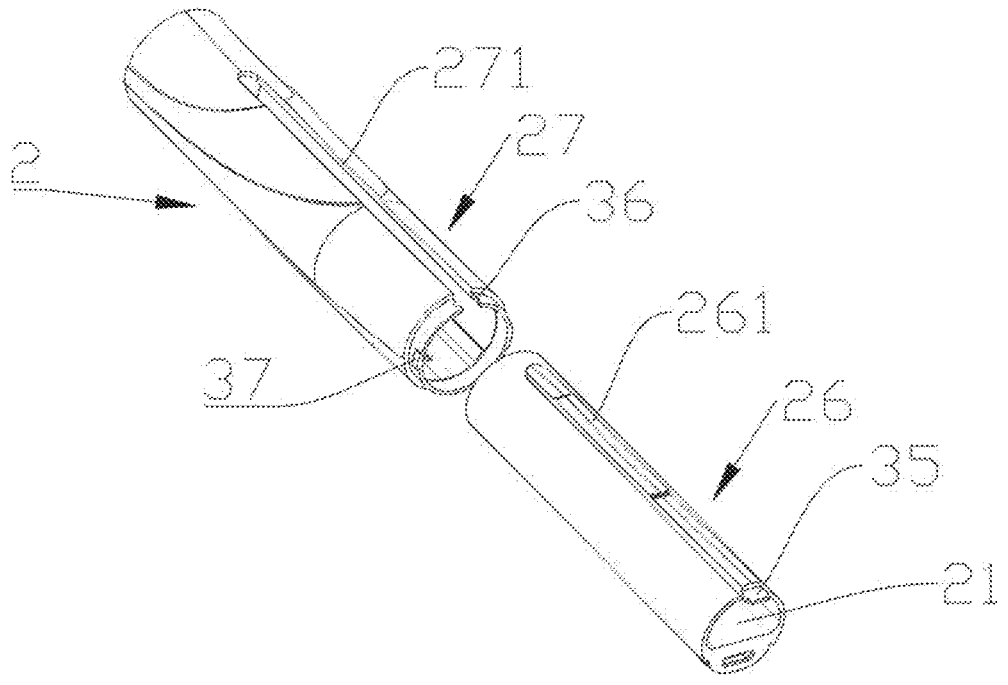
FIG. 9 is an exploded view of the brush barrel shown in FIG. 8.

Further, as shown in FIGS. 8-9, in the embodiment, the storage column 26 is provided with a display strip 261 on the surface corresponding to the material chamber 21. The display strip 261 is a transparent strip used to display the amount of toothpaste stored in the material chamber 21. The surface of the housing 27 is provided with a display slot 271 for installing the display strip 261. The display strip 261 is detachably inserted in the display slot 271. One end of the display strip 261 is provided with a male buckle 35, and one end of the housing 27 is provided with a female buckle 36 in communication with the display slot 271. The display strip 261 is inserted into the display slot 271 so that the male buckle 35 is engaged with the female buckle 36.

Figure 10:
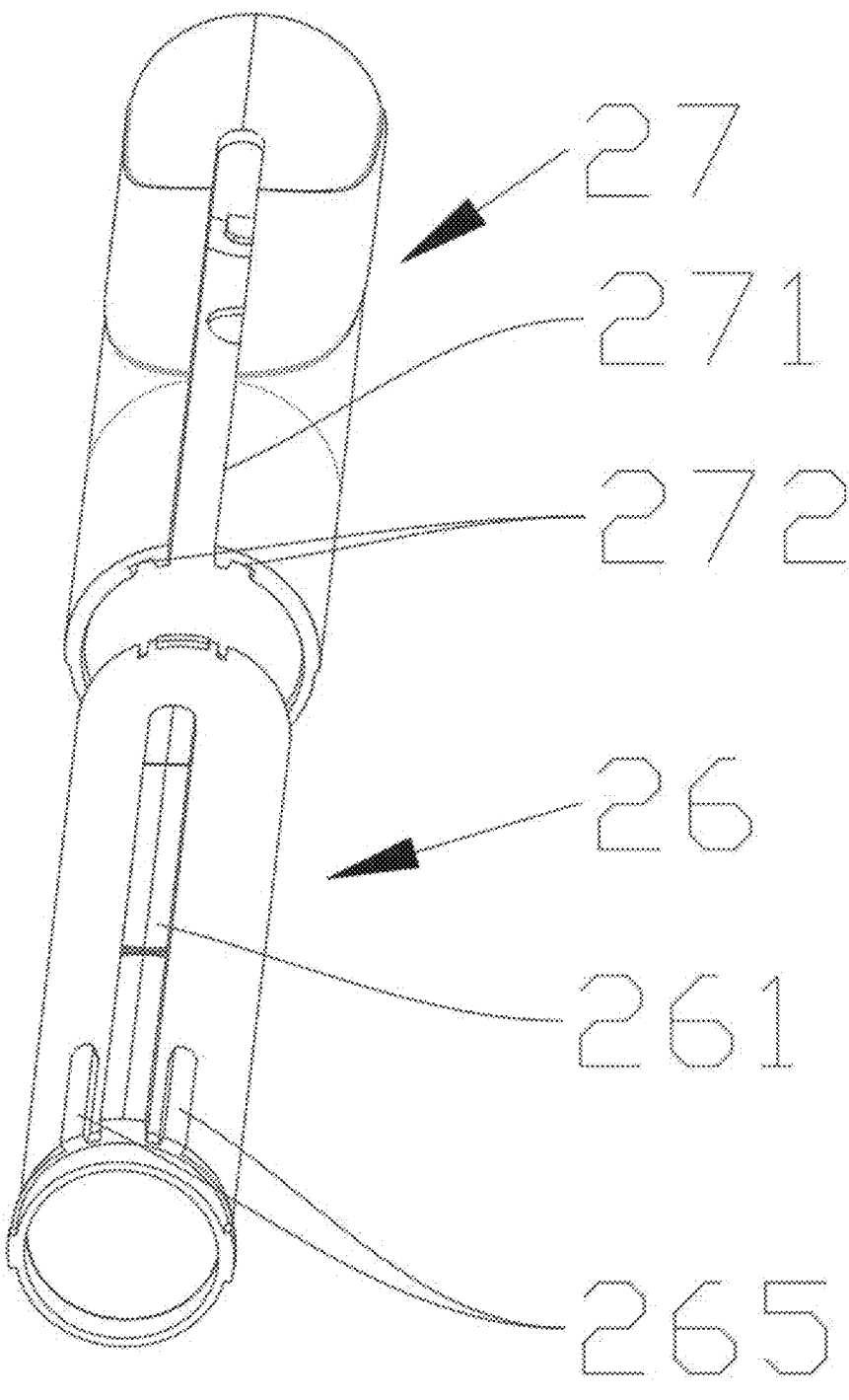
FIG. 10 is another exploded view of the brush barrel shown in FIG. 8.
Figure 11:
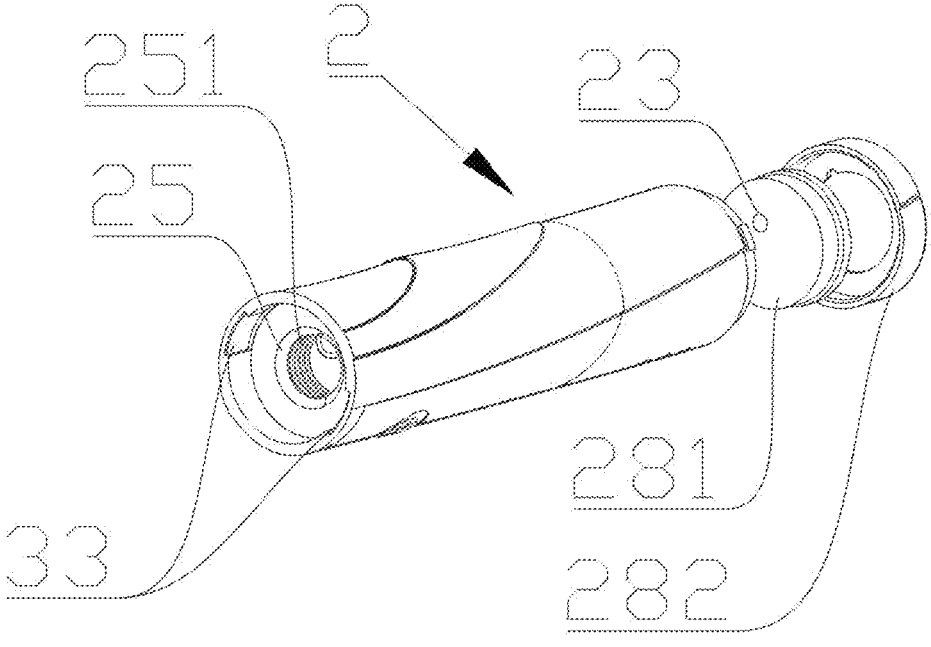
FIG. 11 is an exploded view of the brush barrel and the bottom cover.
Figure 12:
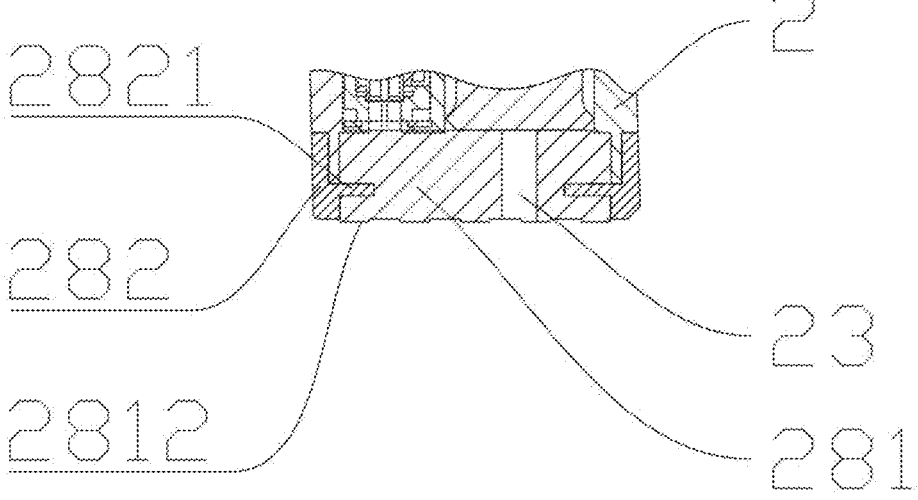
FIG. 12 is an in-section view of the soft rubber tube.
Figure 13:
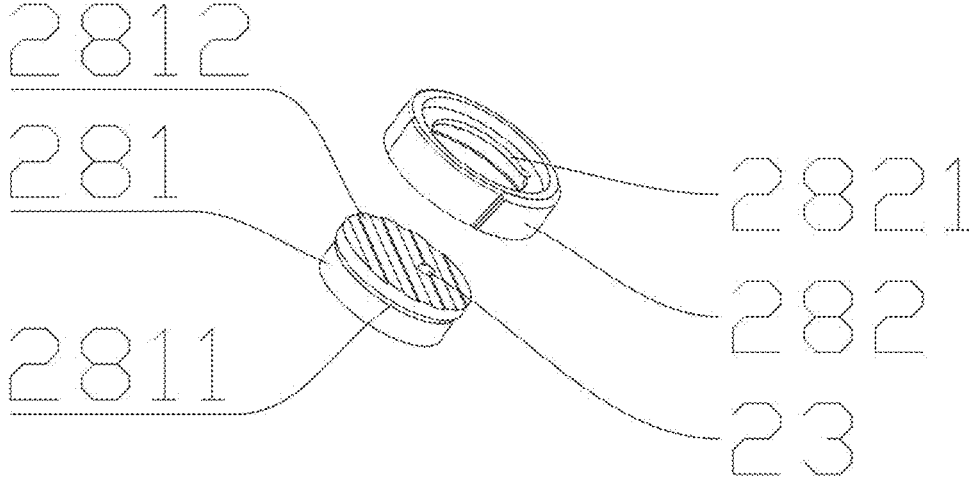
FIG. 13 is an exploded view of the bottom cover.
Figure 14:
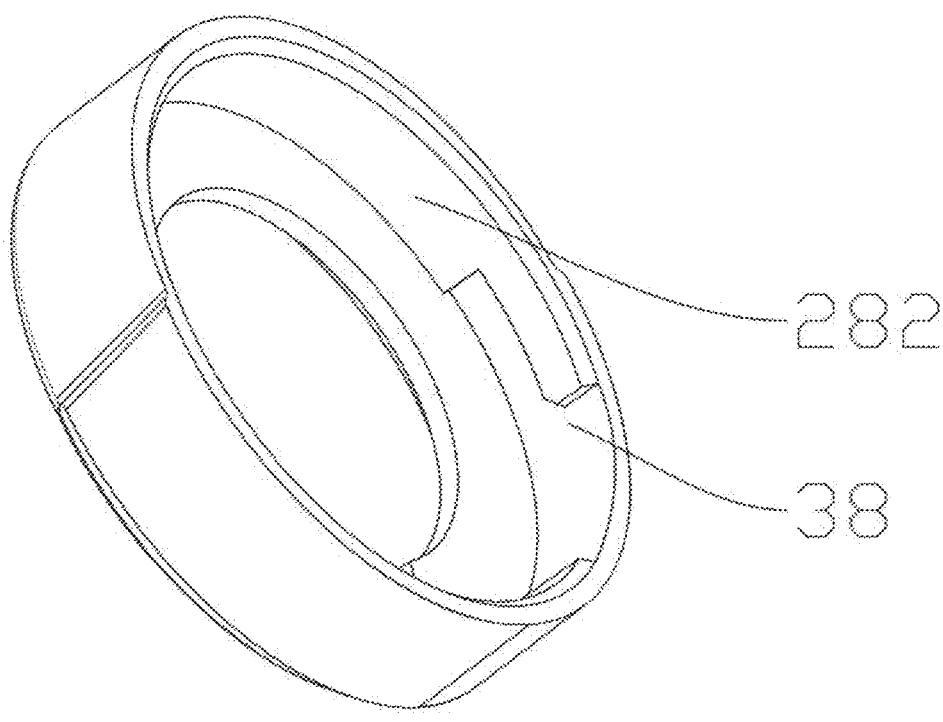
FIG. 14 is a perspective view of the bottom cover.

The installation method of the display strip 261 and the housing 27 can also be connected by setting sliding grooves and sliders. As shown in FIG. 10. a guiding groove 272 is opened at the cylindrical surface of the housing 27, and corresponding guiding sliders 265 are set on both sides of the display strip 261. The display strip 261 is installed on the housing 27 by inserting the guiding sliders 265 into the guiding grooves 272.

Further, as shown in FIGS. 7-14, in the embodiment, the base 28 includes a soft rubber component 281 and a bottom cover 282. The soft rubber component 281 is detachably installed inside the bottom cover 282, and the bottom cover 282 is rotated to connect to one end of the housing 27 away from the fastening port 25. The upper end surface of the soft rubber component 281 is against the opening of the material chamber 21, and the exhaust hole 23 is set inside the soft rubber component 281.

Specifically, the lower end of the bottom cover 282 is provided with at least two second snap grooves 37, the inner wall of the brush barrel 2 is provided with two second clamped blocks 38 corresponding to the second snap grooves 37. When the brush barrel 2 is mounted on the lower end of the bottom cover 282, the second clamped blocks 38 are engaged in the second snap grooves 37 so that the brush barrel 2 is locked on the lower end of the bottom cover 282.

Further, as shown in FIGS. 7-14, in the embodiment, the inner of the bottom cover 282 is provided with a block 2821, and the soft rubber component 281 is provided with a slot 2811 corresponding to the block 2821. The soft rubber component 281 is clamped in the slot 2811 through the block 2821 so that it is installed inside the bottom cover 282. The bottom of the soft rubber component 281 is provided with anti-slip patterns 2812 to increase friction force.

Further, as shown in FIGS. 5-8, in the embodiment, the storage column 26 is provided with a vibration assembly including a vibrating motor 262, a circuit board 263, and a battery 264. The vibrating motor 262 is electrically connected to the circuit board 263, which is used to control the vibration of the vibrating motor 262. The battery 264 is electrically connected to the vibrating motor 262 and the control board, which controls the power supply of the battery 264 to the vibrating motor 262.

The work principle in the embodiment is as follows: A button is installed on the wall of the brush barrel 2, and one end of the button is electrically connected to circuit board 263 for signal transmission. When the button is pressed, a signal is transmitted to the circuit board 263 to activate the vibrating motor 262. The vibrating motor 262 vibrates the brush barrel 2, thereby driving the brush handle 1 and the bristle 11 to vibrate. When the button is pressed again, the signal is transmitted to the circuit board 263 to control the vibrating motor 262 to stop vibrating.

Figure 15:
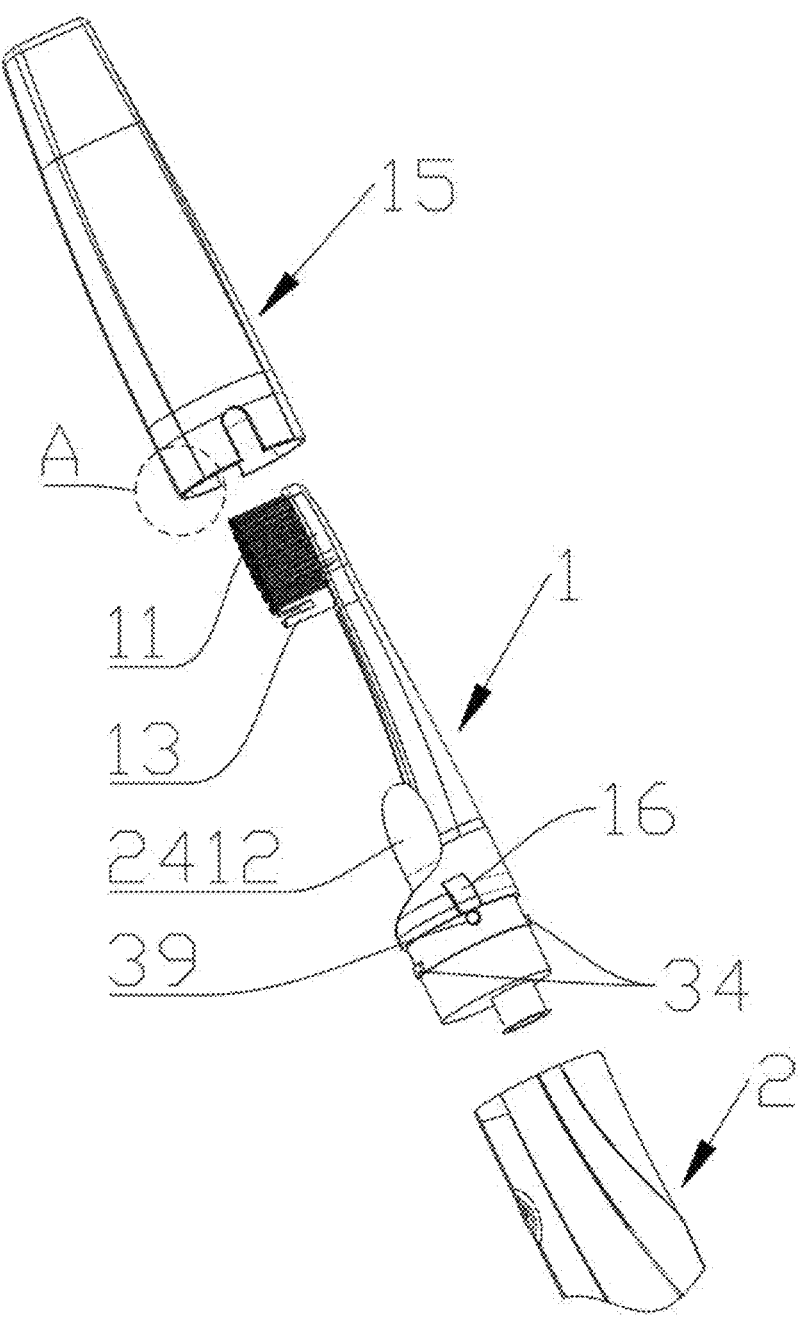
FIG. 15 is a perspective view of the protective cover.
Figure 16:
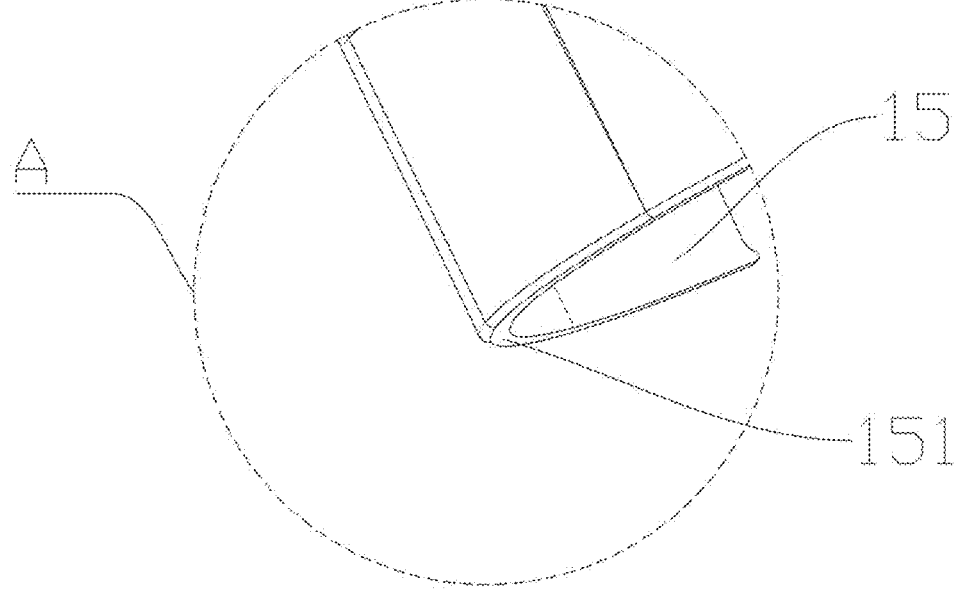
FIG. 16 is an enlarged view of portion A in FIG. 15.

Further, as shown in FIGS. 15-16, in the embodiment, the brush handle 1 is equipped with a protective cover 15. The edge of the lower end of the brush handle 1 is chamfered, and the lower end of the protective cover 15 has an inward opening with a flange 151. The flange 151 is chamfered to fix the protective cover 15 to brush handle 1.

Further, as shown in FIGS. 3 and 15, in the embodiment, the brush handle 1 is provided with twisting blocks 16, the lower end of the brush handle 1 is mounted at least two twisting blocks 16. When supplementing toothpaste, the operator needs to disassemble the brush handle 1, which can be easily removed by grasping the twisting blocks 16 at both ends, providing anti-slip function.

For those skilled in the art, it is apparent that the present disclosure is not limited to the details of the exemplary embodiments described above and can be implemented in other specific forms without departing from the spirit or basic features of the present disclosure. Therefore, from any point of view, the embodiments should be regarded as exemplary and not limiting, and the scope of the present disclosure is limited by the appended claims rather than the above description. Therefore, it is intended to include all changes falling within the meaning and scope of the equivalent elements of the claims in the present disclosure.

What is claimed is:

1. An electric toothbrush capable of automatically squeezing toothpaste, comprising a brush handle and a brush barrel, said brush handle is detachably mounted on an upper end of said brush barrel; wherein an upper end of said brush handle is provided with bristles on an outside, and said brush handle is hollow inside to form a connecting hole extending to said bristles; a first one-way valve is provided near said bristles, with an output end of said first one-way valve facing said bristle; said brush barrel is provided with a material chamber where a piston is installed; a bottom of said brush barrel is equipped with an exhaust hole communicating with said material chamber; one opening end of said material chamber near said brush handle communicates with said connecting hole to form a pathway;

said brush handle is equipped with a pressing pump inserted in said connecting hole; said pressing pump is an internal hollow structure with one end provided with a second one-way valve, and the other end provided with a third one-way valve embedded in said pressing pump; an output end of said third one-way valve faces said bristles; said pressing pump is provided with a pressing block; a surface of said brush handle corresponding to said pressing block is provided with a pressing port to expose said pressing block; and an inner upper end of said brush barrel is equipped with a fastening port communicating to said material chamber; a lower end of said pressing pump is detachably connected to said fastening port so that a lower end of said third one-way valve is communicated with said fastening port; said fastening port is provided with an internal thread that fastens an outlet of a toothpaste container when a toothpaste in said toothpaste container is replenished in said material chamber.

2. The electric toothbrush capable of automatically squeezing toothpaste according to claim 1, wherein said pressing pump includes a casing and a guiding element; said casing is inserted into said connecting hole to form two chambers inside said brush handle; said casing is a hollow structure; said second one-way valve is arranged at an upper end of said casing; said pressing block is arranged on a side of said casing near said pressing port; and said guiding element is detachably installed inside said casing; a first through-hole is provided inside said guiding element, and one end of said first through-hole near said bristle is against said second one-way valve; a pressure hole is provided on a surface of said guiding element near said pressing block and in communication with said pressing block; said third one-way valve is detachably installed in said first through-hole, and an output end of said third one-way valve faces said bristles, a lower end of said guiding element is detachably connected to said fastening port so that said first through-hole communicates with said fastening port.

3. The electric toothbrush capable of automatically squeezing toothpaste according to claim 1, wherein said brush barrel includes a storage column, a housing, and a base; said storage column is inserted into said housing, and said material chamber is set inside said storage column; said fastening port is embedded at an upper end of said housing, and said base is flexibly connected to one end of said housing so that an upper end surface of said base is against said opening end of said material chamber.

4. The electric toothbrush capable of automatically squeezing toothpaste according to claim 3, wherein said storage column is provided with a display strip on a surface corresponding to said material chamber; said display strip is a transparent strip used to display an amount of toothpaste stored in said material chamber; a surface of said housing is provided with a display slot for installing said display strip.

5. The electric toothbrush capable of automatically squeezing toothpaste according to claim 3, wherein said base includes a soft rubber component and a bottom cover; said soft rubber component is detachably installed inside said bottom cover, and said bottom cover is rotated to connect to one end of said housing away from said fastening port; an upper end surface of said soft rubber component is against said opening end of said material chamber, and said exhaust hole is set inside said soft rubber component.

6. The electric toothbrush capable of automatically squeezing toothpaste according to claim 5, wherein an inner of the bottom cover is provided with a block, and said soft rubber component is provided with a slot corresponding to said block; said soft rubber component is clamped in said slot through said block so that it is installed inside said bottom cover; said bottom of said soft rubber component is provided with anti-slip patterns to increase friction force.

7. The electric toothbrush capable of automatically squeezing toothpaste according to claim 3, wherein said storage column is provided with a vibration assembly including a vibrating motor, a circuit board, and a battery; said vibrating motor is electrically connected to said circuit board, which is used to control a vibration of said vibrating motor; said battery is electrically connected to said vibrating motor and said control board, which controls said power supply of said battery to said vibrating motor.

8. The electric toothbrush capable of automatically squeezing toothpaste according to claim 3, wherein said brush handle is equipped with a protective cover, an edge of said lower end of said brush handle is chamfered, and a lower end of said protective cover has an inward opening with a flange, said flange is chamfered to fix said protective cover to said brush handle.

9. The electric toothbrush capable of automatically squeezing toothpaste according to claim 3, wherein said brush handle is provided with twisting blocks, said lower end of said brush handle is mounted with at least two twisting blocks.

\* \* \* \* \*